United States Patent
Butsch et al.

(10) Patent No.: US 11,511,466 B2
(45) Date of Patent: Nov. 29, 2022

(54) DECORATIVE PART FOR A MOTOR VEHICLE

(71) Applicant: RICHARD FRITZ HOLDING GMBH, Besigheim (DE)

(72) Inventors: Erwin Butsch, Winnenden (DE); Tanja Spaegele, Kornwestheim (DE); Michael Netzlaf, Walheim (DE)

( * ) Notice: Subject to any disclaimer, the term of this patent is extended or adjusted under 35 U.S.C. 154(b) by 0 days.

(21) Appl. No.: 16/863,633

(22) Filed: Apr. 30, 2020

(65) Prior Publication Data
US 2020/0346591 A1  Nov. 5, 2020

(51) Int. Cl.
| | | |
|---|---|---|
| B32B 3/06 | (2006.01) | |
| B32B 7/12 | (2006.01) | |
| B32B 17/10 | (2006.01) | |
| B60R 13/00 | (2006.01) | |
| B29C 45/00 | (2006.01) | |
| B29C 45/14 | (2006.01) | |
| B29L 31/30 | (2006.01) | |
| B29K 709/08 | (2006.01) | |
| B29K 101/12 | (2006.01) | |

(52) U.S. Cl.
CPC .... *B29C 45/0001* (2013.01); *B29C 45/14336* (2013.01); *B32B 3/06* (2013.01); *B32B 7/12* (2013.01); *B32B 17/10* (2013.01); *B60R 13/00* (2013.01); *B29C 2045/14459* (2013.01); *B29K 2101/12* (2013.01); *B29K 2709/08* (2013.01); *B29L 2031/3041* (2013.01); *B32B 2605/006* (2013.01)

(58) Field of Classification Search
CPC .. B32B 3/06; B32B 7/12; B32B 17/10; B32B 17/10018; B32B 2605/006; B60R 13/00
See application file for complete search history.

(56) References Cited

U.S. PATENT DOCUMENTS

| | | | |
|---|---|---|---|
| 6,449,916 B1* | 9/2002 | Waters | B44C 5/0407 156/63 |
| 2011/0267833 A1* | 11/2011 | Verrat-Debailleul | B60Q 3/208 362/545 |
| 2012/0167473 A1* | 7/2012 | Schapitz | B60J 10/16 49/431 |
| 2017/0259531 A1* | 9/2017 | Santi | B62D 25/06 |
| 2018/0178734 A1* | 6/2018 | Butsch | B32B 17/10018 |
| 2019/0077337 A1* | 3/2019 | Gervelmeyer | B32B 17/10137 |

FOREIGN PATENT DOCUMENTS

| | | |
|---|---|---|
| DE | 102017100776 | 3/2018 |
| DE | 102016125814 | 6/2018 |
| EP | WO 2017/158031 | 9/2017 |
| EP | 3 243 652 | 11/2017 |

* cited by examiner

*Primary Examiner* — Joanna Pleszczynska
(74) *Attorney, Agent, or Firm* — Mark Wisnosky

(57) ABSTRACT

The invention relates to a decorative part (11) for a motor vehicle and a method for the production thereof, having a carrier part (18) and having a covering part (12) made of a single-pane safety glass, which are connected to each other, wherein a bonding agent layer (17) is applied over the entire surface on a fixing side (16) of the covering part (12) opposite the visible side (14) of the decorative part (12), and a layer made of a thermoplastic elastomer (26) is provided over the entire surface on the bonding agent layer (17), by means of which the carrier part (18) is fixedly connected to the covering part (12), wherein at least one sealing lip (34, 51) is moulded on the TPE layer (26).

3 Claims, 4 Drawing Sheets

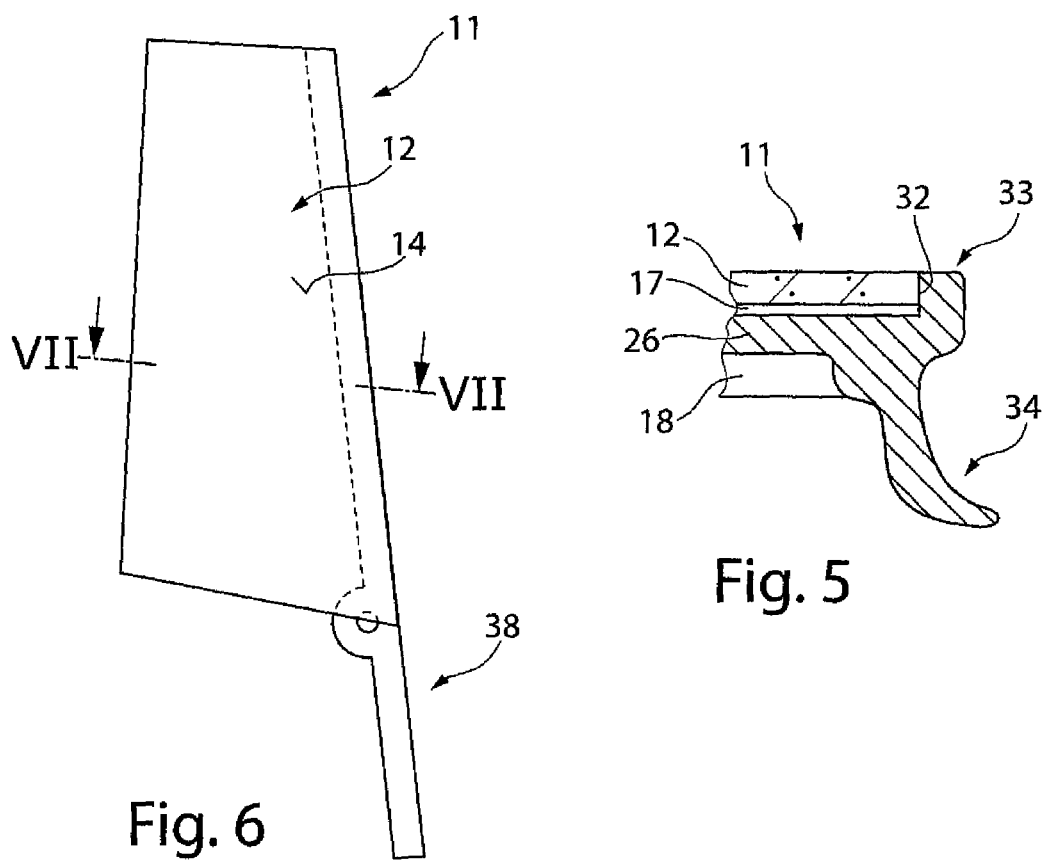
Fig. 5
Fig. 6
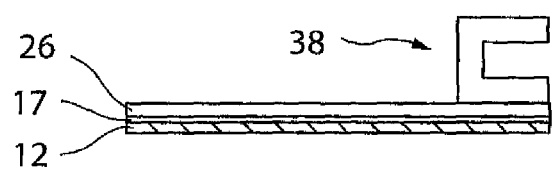
Fig. 7

DECORATIVE PART FOR A MOTOR VEHICLE

CROSS-REFERENCE TO RELATED APPLICATIONS

This application claims priority too German patent application DE 102019111268.0 titled Decorative part for a motor vehicle and method for the production thereof, filed 2 May 2019, by the same inventors and currently pending.

STATEMENT REGARDING FEDERALLY SPONSORED RESEARCH OR DEVELOPMENT

Not Applicable.

BACKGROUND OF THE INVENTION

Technical Field

The invention relates to a decorative part for a motor vehicle and a method for the production thereof, wherein the decorative part comprises a carrier part made of a thermoplastic plastic and a covering part made of a single-pane safety glass, which are connected to each other to form a constructive unit.

Related Background Art

A thermoplastic carrier glass compound is known from EP 3 243 625 A1. This compound constructive part comprises a layer made of glass and a layer made of a thermoplastic material, wherein a layer made of a thermoplastic polyurethane is provided between the layer made of glass and the thermoplastic material. A bonding agent layer is provided between the thermoplastic polyurethane and the glass. For this compound constructive part, a glass is used, which comprises a low thickness and is pretensioned.

A decorative part is known from WO 2017/158031 A, which can be used on an A, B or C column. This decorative part comprises a glass pane made of a thin glass. A primer or a PU adhesive is applied to the rear side of the glass pane in order to fix a carrier. This carrier can consist of a thermosetting material or a liquid silicone.

Such a decorative part for a motor vehicle is known from DE 10 2016 125 814 A1. The carrier part consists of a thermoplastic plastic which is connected to a covering part made of a glass. Here, the covering part is fixed on a fixing portion of the carrier part by means of back injection or by means of a glue bead or by means of a double-sided adhesive tape. The carrier part is formed as a frame, wherein the fixing portion of the carrier part extends along an outer edge region of the longitudinal side of the covering part. At least one central region of the covering part on a fixing side opposite the visible side is not supported by the fixing portion of the carrier part.

The object of the invention is to propose a decorative part for a motor vehicle, which fulfils the high safety requirements when used in a motor vehicle. Furthermore, the object of the invention is to propose a cost-effective method for such a decorative part.

BRIEF SUMMARY OF THE INVENTION

This object is solved by a decorative part, in which a layer made of binding agent is applied over the entire surface to a fixing side of the covering part, said fixing side lying opposite the visible side of the covering part, and a layer made of thermoplastic elastomer (TPE layer) is provided over the entire surface on the layer as the bonding agent, by means of which layer the carrier part is fixedly connected to the covering part, and that at least one sealing lip is moulded by the layer made of thermoplastic elastomers. Thus, on one hand, a three-layer compound consisting of the covering part made of a single-pane safety glass, the layer made of binding agent and the layer made of TPE, and, on the other hand during the production of the three-layer compound, at least one sealing lip is formed directly, which is made possible for a water management between the covering part and a bodywork, in which the decorative part is fixed. When the single-pane safety glass is damaged or destroyed, for example as a result of a stone impact, a detachment of glass fragments is prevented because of the connection to the layer made of bonding agent and the TPE layer. Thus, the safety requirements can be fulfilled. When the single-pane safety glass is damaged or destroyed, it can also remain ensured that the water management is furthermore maintained in order to avoid moisture entering the vehicle.

Furthermore, the covering part preferably has two longitudinal sides lying opposite each other and narrow sides connecting the longitudinal sides, wherein the longitudinal sides are multiple times longer than the narrow sides, and the carrier part comprises a frame structure, which is formed by two holding portions running along the longitudinal side of the covering part or by a U-shaped arrangement of the holding portions, which extend along the longitudinal sides and a narrow side of the covering part, or is formed by holding portions, which are arranged to form a closed frame, wherein a rib structure extends between the at least two holding portions. This carrier part is connected to the covering part by the layer made of the thermoplastic elastomer and supports the covering part. Thus, on one hand, a simple construction can be achieved. On the other hand, a sufficient rigidity can be formed for the covering part, in particular when the covering part is formed from a thin glass or thinnest glass.

Furthermore, the at least one sealing lip preferably encompasses several ribs of the rib structure along its extension and is formed to protrude in relation to the ribs. Furthermore, this makes it possible for the rib structure to comprise a fixed attachment to the layer made of thermoplastic elastomer. Moreover, a simple and cost-effective injection of the at least one sealing lip or formation of the at least one sealing lip made of the layer of the thermoplastic elastomer is possible.

Preferably, abutment elements made of the TPE layer protruding in relation to the fixing side of the covering part are formed inside the frame structure of the carrier part, said abutment elements extending through between the ribs of the rib structure or engaging at least portionally around the ribs of the rib structure. Thus, a simple and cost-effective production of such abutment elements can be made possible, whereby the covering part can be arranged spaced apart uniformly from the bodywork of the motor vehicle and to damp vibrations.

Furthermore, abutment elements made of the TPE layer protruding in relation to the fixing side of the decorative part can be advantageously formed on the holding portions of the frame structure, which abutment elements are supported on the holding portions of the frame structure and are connected to the it. Thus, a support of the decorative part for the bodywork of the motor vehicle can also be made possible in the edge region of the decorative part.

A further preferred embodiment of the decorative part provides that the carrier part comprises a connection surface, which engages over the entire surface on the surface of the TPE layer. This connection surface can be congruent to the surface of the fixing side of the covering part. Thus, a stabilisation of the three-layer compound can take place.

Alternatively, the holding portion of the frame structure can be formed as a window guide web, which is connected to the TPE layer. Thus, extensive applications are possible. On one hand, the decorative part can be used as an aperture on the B-column, for example. On the other hand, such a decorative part can also simultaneously guide a pane that can moved up and down as a result of the attachment of the window guide web. Such a decorative part can also be provided, for example, as a triangular pane in a rear passenger door or as an aperture on a C-column. Such a decorative part can also be used in the roof region or in the rear window region.

Furthermore, the TPE layer at least portionally surrounds a peripheral rear face of the covering layer. Preferably, a border of the rear face of the covering part made of TPE extends flush with the visible side of the covering part. Thus, there can simultaneously be an edge protector. Moreover, there can be a corresponding tolerance compensation or a closed transition region between the covering part and a bodywork opening.

The TPE layer is preferably formed as a back-injection of the covering part over the entire surface. Thus, the three-layer compound made of the single-pane safety glass, the bonding agent and the TPE layer can have a congruent overlay. The TPE layer can also regionally extend beyond the fixing side of the covering part and form at least one functional component. The sufficient stability can be given to the thin single-pane safety glass as a result of the three-layer compound.

A further preferred embodiment provides that the carrier part is produced from a polypropylene (PP), a polycarbonate (PC) or an acrylonitrile-butadiene styrene copolymer (ABS) or a PC/ABS compound. Preferably, a bonding agent layer is applied to the connection surface of the carrier part or on the side of the TPE layer pointing to the carrier part.

Furthermore, the carrier part has fixing elements for fixing the decorative part to a bodywork. For example, such fixing elements can be formed as a screw, plug or clip connection, which enable a fixing of the decorative part to the bodywork in a simple manner.

In this decorative part, the covering part preferably has a thickness of 2.1 mm or less. In particular, a thickness of the covering part of 1.6 mm, 1 mm or 0.7 mm can be used. Because of the three-layer compound, such thin single-plane safety glasses can be used. Moreover, this has the advantage that the decorative part is lighter than a covering part consisting of plastic.

Preferably, the TPE layer has a thickness of from 1.0 mm to 2.5 mm. Thus, a small construction height of the three-layer compound can be achieved.

The object underlying the invention is furthermore solved by a method for producing a decorative part for a motor vehicle, in which the decorative part comprises a carrier part made of a thermoplastic plastic and a covering part made of a single-plane safety glass, which are connected to each other to form a constructive unit, wherein the covering part is placed in a cavity of an injection moulding device, wherein a layer made of a bonding agent applied over the entire surface on a fixing side of the covering part opposite the visible side is aligned to point to a carrier part, and the carrier part is also placed into the cavity, and the carrier part is attached to the covering part by a back-injecting of the fixing side of the cover part over the entire surface with a layer made of a thermoplastic elastomer, and in which at least one sealing lip and/or one abutment element is simultaneously injected according to one of the embodiments described above by back-injecting the fixing side of the covering part. This production method has the advantage that, on one hand, a cost-effective production is made possible and, on the other hand, a three-layer compound consisting of the single-plane safety glass, the bonding agent and the layer made of TPE, and at least one sealing lip for a water management or a water guide for dissipating moisture and water is created, whereby a high degree of safety is created with motor vehicles despite the use of single-pane glass.

The invention and further advantageous embodiments and developments thereof are described and explained in more detail below by means of the examples depicted in the drawings. The features that can be seen in the description and drawings can, according to the invention, be applied individually or in any combination.

BRIEF DESCRIPTION OF THE DRAWINGS

Here are shown.

DETAILED DESCRIPTION OF THE INVENTION

Figure 1:
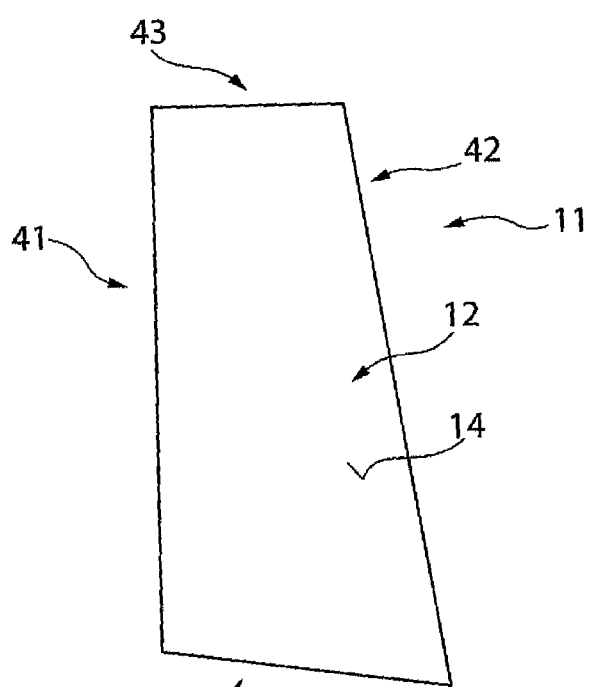
FIG. 1 a schematic view of a decorative part.
Figure 3:
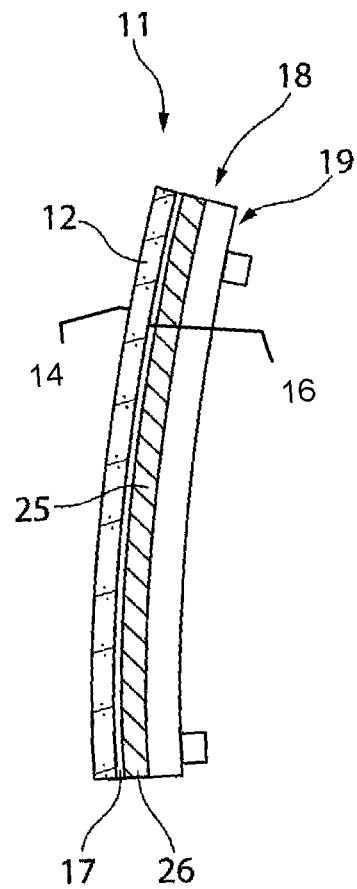
Figure 2:
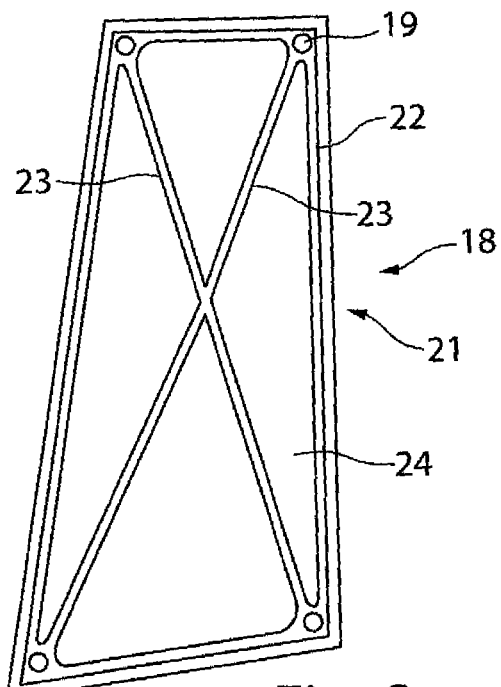
FIG. 2 a schematic rear view of the decorative part according to FIG. 1, FIG. 3 a schematic side view of the decorative part according to FIG. 1, FIG. 4 a schematic sectional view of an embodiment for an edge region of the decorative part according to FIG. 1, FIG. 5 a schematic sectional view of a further embodiment of an edge region of the decorative part according to FIG. 1, FIG. 6 a schematic view of an alternative embodiment of the decorative part to FIG. 1, FIG. 7 a schematic view along the line VII-VII in FIG. 6, FIG. 8 a schematic view from the front of an alternative embodiment of a decorative part, FIG. 9 a schematic rear view of a decorative part according to FIG. 8, and FIG. 10 a schematic sectional view along the line IX-IX in FIG. 9.

A schematic view of a decorative part 11 is depicted in FIG. 1. FIG. 2 shows a rear view and FIG. 3 shows a schematic side view of the decorative part 11 according to FIG. 1. This decorative part 11 is formed, for example, as a column aperture, in particular for a B-column or C-column, or as a further decorative aperture for a motor vehicle. The decorative part 11 consists of a covering part 12 having a visible side 14. A carrier part 18 (FIG. 2) is provided on a rear side to the visible surface 14 of the covering part 12. For example, fixing elements 19, such as screws, pins, clips or similar, for example, can be provided on this carrier part 18 or fixed thereon in order to fix the decorative part 11 to a bodywork or a bodywork opening. The carrier part 18 according to FIG. 2 has a frame structure 21 which comprises a peripheral frame 22, for example, which is stiffened by individual ribs 23. The frame 22 and the ribs 23 have a connection surface 25 for attaching to the covering part 12. Advantageously, an outer geometry of the frame 22 corresponds to the outer geometry of the covering part 12. The regions between the ribs 23 can be formed as openings 24 according to a first embodiment. Alternatively, the frame 22 and the ribs 23 can also be provided on a closed connection surface 25, which is aligned to point to the covering part 12 of the decorative part 11.

The covering part 12 is formed from a single-pane safety glass. This covering part 12 can be formed to be untensioned, partially pretensioned or chemically cured. The covering part 12 can be formed to be planar or curved. A layer made of bonding agent 17 is applied over the entire surface on a fixing side 16 opposite the visible side 14. Thus, the rear side of the visible side 14, which forms the fixing side 16, is covered over the entire surface by the layer made of bonding agent 17.

Furthermore, the decorative part 11 comprises a layer 26 made of a thermoplastic elastomer. This TPE layer 26 also extends over the entire surface to the fixing side 16. This TPE layer 26 is connected over the entire surface to the bonding agent layer 17. Thus, a three-layer compound over the entire surface is formed.

As a result of this construction of the decorative part 11 with the layer made of binding agent 17 and the TPE layer 26, a compound adhered to one another made of three layers is created. This three-layer compound makes a safe use of the decorative part made of a single-pane safety glass possible and, in the event of damage to the single-pane safety glass, prevents a detachment of glass fragments.

The carrier part 18 is connected to the covering part 12 by means of the TPE layer 26 and forms the decorative part 11. The TPE layer 26 is produced by a back-injection of the covering part 12 over the entire surface and fixedly connects the carrier part 18 to the TPE layer 26.

Figure 4:
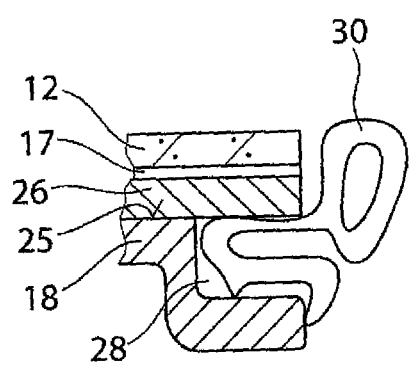

In FIG. 4, a schematic sectional view of an embodiment for an edge region of the decorative part 11 is depicted. Here, the carrier part 18 can have a receiving portion 28, in particular a U-shaped receiving portion 28 open on the edges, in the edge region of the three-layer compound. A sealing profile 30 or a sealing element can be used thereon. This sealing profile 30 can extend along one or more longitudinal sides of the decorative part 11 or across the entire periphery around an edge region of the decorative part 11.

In FIG. 5, a schematic sectional view of a further embodiment of an edge region for the decorative part 11 according to FIG. 1 is depicted. In this embodiment, it is provided, for example, that the TPE layer 26 engages around a rear face 32 of the decorative part 12 with a border 33 made of TPE. The border 33 and the TPE layer are formed integrally. Thus, an edge protection for the decorative part 11 can be created.

Furthermore, it emerges from FIG. 5 that the TPE layer 26 simultaneously has a sealing lip 34. This sealing lip 34 can be formed as an integrated component of the TPE layer 26. The sealing lip 34 and the border 33 can be formed simultaneously or also each individually and independently of one another.

In FIG. 6, a further alternative of the decorative part 11 is depicted. The construction of the decorative part with the three-layer compound consisting of the covering part 12 of the layer made of bonding agent 17 and the layer made of TPE 26 corresponds to the exemplary embodiment above. The carrier part 18 can be formed as a window guide web, deviating from the embodiment described above. Such a carrier part 18 has a U-shaped receiver, in order to receive and guide a seal for a pane that can be moved up and down. The carrier part 18 formed as a window guide web is depicted in a sectional view in FIG. 7.

In addition to the window guide web, the carrier part 18 has a further frame structure 21 for receiving and attaching the covering part 12 to the bodywork.

In the embodiments described above, the bonding agent 17 applied to the fixing side 16 of the covering part 12 over the entire surface is conditioned and is activated by a temperature exposure. An adhesion over the entire surface to the TPE layer 26 is obtained by the activation. This temperature exposure is preferably carried out when back-injecting the covering part 12 for producing the layer made of TPE 26.

An injection moulding system consisting of two injection moulding machines and a handling device can be provided to produce such a decorative part 11. In a first injection moulding machine, the carrier part 18 can be produced in a first cycle. In parallel to this, the covering part 12 with the bonding agent layer applied to the fixing side 16 over the entire surface is placed into a cavity of the second injection moulding machine. This can take place automatically by means of the handling device. Subsequently to or before placing the covering part 12, the carrier part produced in the first injection moulding machine can be transferred and placed in the cavity of the second injection moulding machine. Here, the connecting face 25 of the carrier part is aligned in relation to the covering part 12. The covering part 12 with the bonding layer 17 is aligned to point towards the carrier part 18 in the cavity of the second injection moulding machine. The cavity is then closed. A TPE material is injected into the cavity, in order to back-inject the covering part 12 over the entire surface. At the same time, an attachment of the carrier part 18 to the TPE layer 26 to be formed takes place between the covering part 12 and the carrier part 18. Subsequently, the cavity is opened, the produced decorative part 11 is removed from the cavity and supplied to a reworking station and/or control station.

In the first injection moulding machine for producing the carrier part 18, the hard components are injected, i.e. for example the carrier part 18 made of a plastic material made of PP, PC or ABS. In the second injection moulding machine, a soft component is injected in order to produce the layer made of TPE and the three-layer compound. In addition, a sealing lip, seal and an enclosure or border of the covering part 12 can take place by means of the TPE layer.

Figure 8:
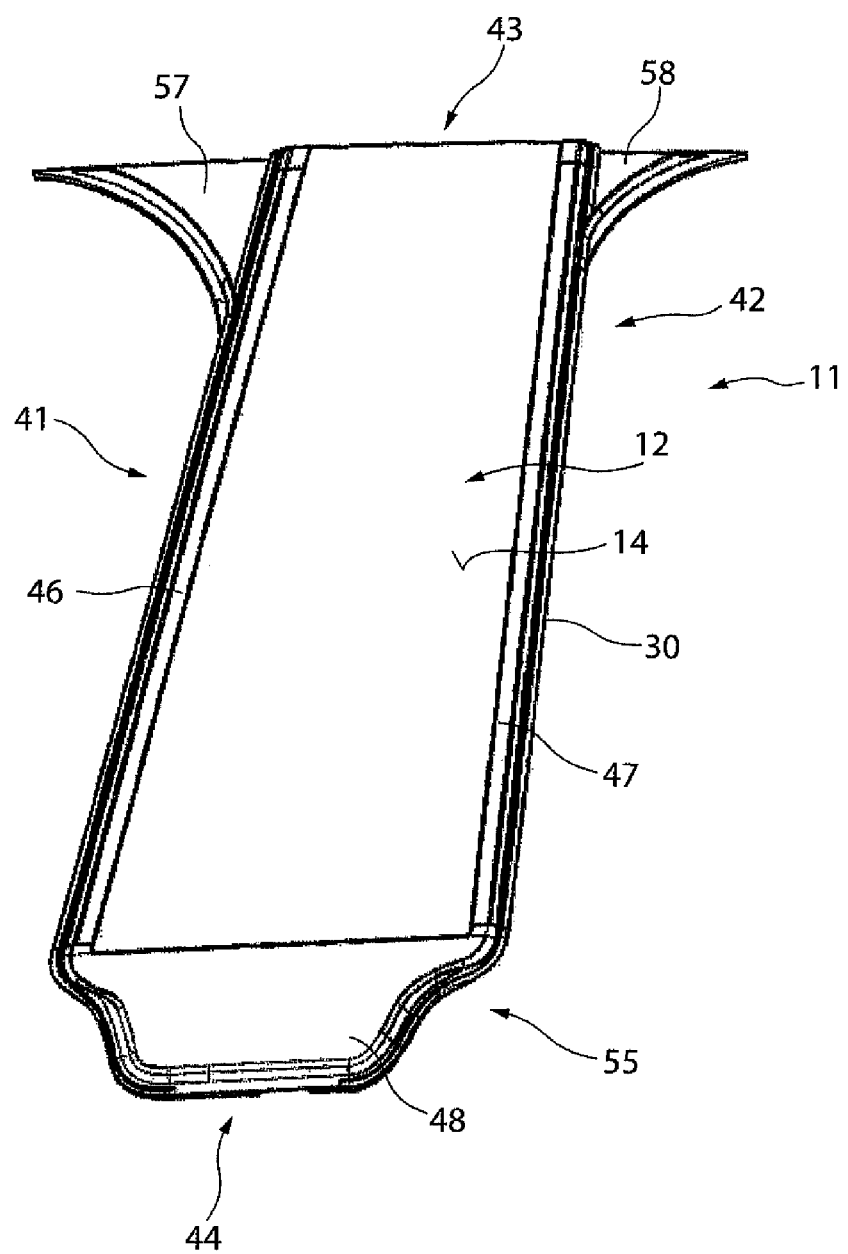
Figure 9:
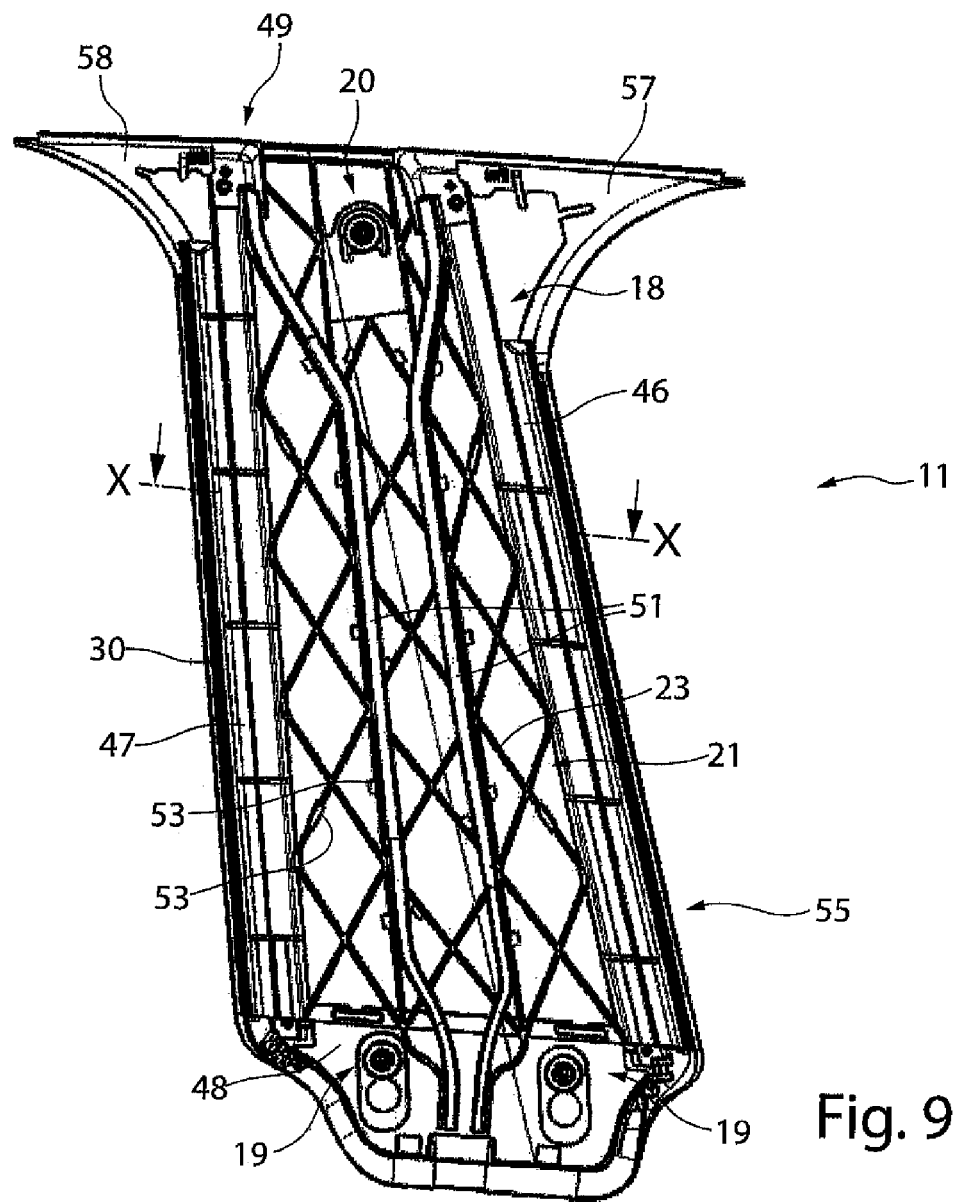

FIG. 9 shows a schematic front view or a side view of an alternative embodiment of a decorative part 11. A rear view of the decorative part 11 according to FIG. 8 is depicted in FIG. 9. The principle construction of this decorative part 11 corresponds to the construction according to the described embodiment in FIGS. 1 to 4. The covering part 12 has, for example, an elongated rectangular or slightly trapezoidal contour and comprises longitudinal sides 41, 42 lying opposite one another that are connected by narrow sides 43, 44. The longitudinal sides 41, 42 are a multiple of the length of the narrow sides 43, 44, at least 1.5 times.

To construct the triple compound and to protect the longitudinal sides 41, 42 of the covering part 12, this embodiment comprises a carrier part 18, which is depicted in FIG. 9. Holding portions 46, 47 are respectively provided along the longitudinal sides 41, 42 of the covering part 12, said holding portions laterally pointing outwards comprising a U-shaped receiving portion 28. These receiving portions 28 are depicted in FIG. 4, for example. A further holding portion 48 is provided on a narrow side 44 or a lower holding portion 48. Thus, the carrier part 18 consists of a U-shaped frame structure consisting of these holding portions 46, 47, 48. A rib structure with ribs 23 extends inside the U-shaped frame structure 21. This rib structure is formed diamondshaped in the exemplary embodiment. This can also consist of squares, hexagons or other geometric shapes strung together. This rib structure can also result in a stiffening of the U-shaped frame structure 21.

Receiver openings for clipping in fastening elements 19 are also provided on the lower holding portion 48. Alternatively, these fastening elements 19 can also be injected directly on the holding portion 48. This applies analogously to an upper fastening element 20.

On its rear side, this decorative part 11 has two sealing lips 51, spaced apart from each other, for example. These sealing lips 51 extend substantially within the frame structure 21 or along the rear side of the covering part 12. These sealing lips 51 consist of the TPE layer 26. The carrier part 18 is connected to the fixing side 16 of the covering part 12 by means of this TPE layer 26. This TPE layer 26 extends over the entire surface on the bonding agent layer 17, which is applied over the entire surface to the covering part 12. In this region, the frame structure 21 having the ribs 23 is fixedly connected to the covering part 12. Furthermore, the holding portions 46, 47, 48, insofar as their edge regions cover the decorative part 12, can also be fixed over the entire surface to the covering edge 12 via the bonding agent layer 17 and the TPE layer 26.

Figure 10:
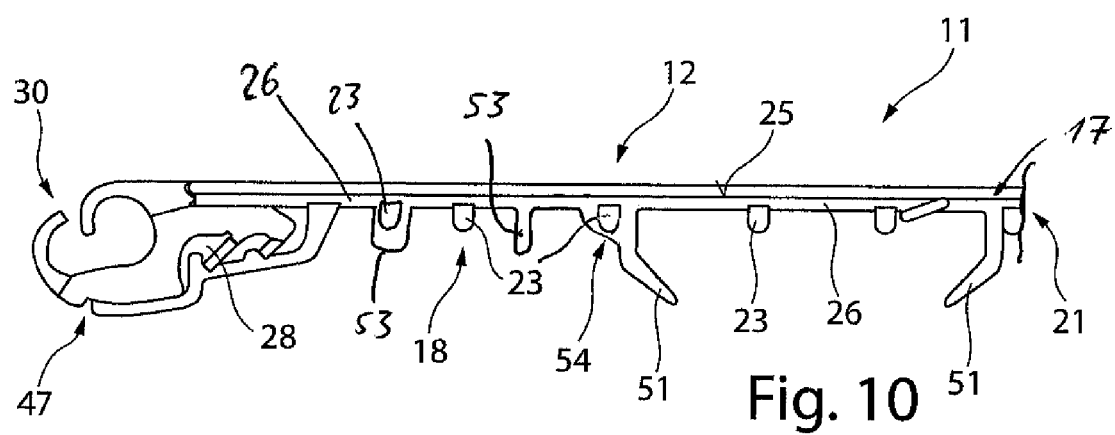

A schematic sectional view along the line IX-IX in FIG. 9 is depicted in FIG. 10. The connection or binding of individual ribs 23 in the region of the sealing lip 51 is illustrated by means of this sectional view. The connecting face 25 of the frame structure 21 is connected to the TPE layer 26. Thus, the frame structure 21 with the ribs 23 is raised in comparison to a continuous surface of the TPE layer 26. The TPE face can also include a part of the height of the ribs 23. However, at least one part of the ribs 23 is not encompassed by the TPE layer 26 along the attachment to the covering part 12. The ribs 23 and their rib structure is thus visible.

The sealing lips 51 preferably extend starting from an upper narrow side 43 of the decoration to a lower holding portion 48 and into this holding portion 48. Advantageously, the sealing lips 51 extend opposite the lower fixing elements 19 and preferably lying between further downwards.

An optimal water guide is adjusted to this course of the sealing lips. Thus, individual ribs 23 are covered in a covering region. For example, such a covering region 54 is depicted in FIG. 10.

Furthermore, preferably when introducing the TPE layer 26, abutment elements 53, in particular abutment buffers, can be simultaneously formed, which extend in opposition to the fixing side 16 of the decorative part 12. These abutment elements 53 can extend freely from the TPE layer 25 or also comprise a covering region 54 with the ribs 23 and are thus aligned identically to the sealing lips 51. Advantageously, the sealing lips 51 and/or the abutment elements 53 have an extension perpendicular to the plane of the covering part 12.

Furthermore, it can be provided in this decorative part 11 that the holding portions 46, 47 have a receiving portion 28, in which sealing profiles 30 are used. The sealing profiles 30 can also be part of an additional soft seal 55, which is formed, for example, as a U-shape. This soft seal 55 comprises triangular regions 57, 58, on the upper end portion holding portions 46, 47. These triangular regions 57, 58 have pockets, such that the holding portions 46, 47 are partially engaged by the front side and by the rear side. Furthermore, the sealing profiles 30 extend from the triangular regions 57, 58 into the lower holding portion 48. This holding portion 48 engages around the lower holding portion 48, as emerges from FIG. 9, and attached directly to the decorative part 11 on the front side. This holding portion 48 is used in the bodywork and cannot be seen from the outside.

We claim:

1. A decorative part (11) for a motor vehicle, comprising:
   a. a covering part (12), the covering part made of a single-pane safety glass having a visible side (14) and a fixing side (16) opposite the visible side, and, a bonding layer (17) applied over the entire fixing side of the covering part, and, a thermoplastic elastomer layer (26) provided over the entire bonding layer, and,
   b. a carrier part (18) comprising a peripheral frame (22), the peripheral frame stiffened by ribs (23) and openings (24) between the ribs and the peripheral frame, and, the peripheral frame and the ribs each having a contact surface (25) by means of which the carrier part (18) is fixedly connected to the thermoplastic elastomer layer, and,
   c. wherein the thermoplastic elastomer layer (26) is formed by a back injection of the covering part (12) and whereby at least one sealing lip (51) is formed within the thermoplastic elastomer layer and the at least one sealing lip forming a covering region (54) over at least one of the ribs (23).

2. The decorative part according to claim 1, wherein abutment elements (53) are each formed by back injection and within the thermoplastic layer and protruding beyond the ribs (23) in a direction perpendicular to the fixing side of the covering part.

3. The decorative part of claim 2 wherein at least one of the abutment elements (53) covers at least one of the ribs (23).

* * * * *